(12) United States Patent
Carr

(10) Patent No.: US 11,944,914 B2
(45) Date of Patent: Apr. 2, 2024

(54) ROTATABLE PLATFORM

(71) Applicant: Richard J. Carr, Grand Blanc, MI (US)

(72) Inventor: Richard J. Carr, Grand Blanc, MI (US)

(*) Notice: Subject to any disclaimer, the term of this patent is extended or adjusted under 35 U.S.C. 154(b) by 0 days.

(21) Appl. No.: 17/528,314

(22) Filed: Nov. 17, 2021

(65) Prior Publication Data

US 2022/0161124 A1 May 26, 2022

Related U.S. Application Data

(60) Provisional application No. 63/118,227, filed on Nov. 25, 2020.

(51) Int. Cl.
| | |
|---|---|
| *F16M 13/00* | (2006.01) |
| *A63F 9/10* | (2006.01) |
| *F16M 11/04* | (2006.01) |
| *F16M 11/08* | (2006.01) |
| *F16M 11/22* | (2006.01) |

(52) U.S. Cl.
CPC ......... *A63F 9/1044* (2013.01); *F16M 11/041* (2013.01); *F16M 11/08* (2013.01); *F16M 11/22* (2013.01)

(58) Field of Classification Search
CPC .......... A63F 9/1044; A63F 2003/00274; A63F 2250/485; A63F 2250/605; F16M 11/041; F16M 11/08; F16M 11/22
See application file for complete search history.

(56) References Cited

U.S. PATENT DOCUMENTS

| | | | | |
|---|---|---|---|---|
| 663,046 | A * | 12/1900 | Schaeffer | A47F 5/02 211/163 |
| 5,549,052 | A * | 8/1996 | Hoffman | A47B 9/00 108/138 |
| 6,779,671 | B2 * | 8/2004 | Varga | B65F 1/141 211/163 |
| 8,544,390 | B1 * | 10/2013 | Bahnsen | F16B 12/26 248/349.1 |
| D938,823 | S * | 12/2021 | Johnson | F16B 12/26 D6/682.3 |
| 11,388,990 | B1 * | 7/2022 | Watkins | A63F 9/1044 |
| 2015/0083029 | A1 * | 3/2015 | Pan | A47B 9/00 108/104 |
| 2022/0249942 | A1 * | 8/2022 | Betlach | A63F 9/1044 |

* cited by examiner

*Primary Examiner* — Amy J. Sterling

(57) ABSTRACT

A rotatable platform for facilitating the assembly of a jigsaw puzzle by multiple person includes (a) a base having an upper or top surface and a lower surface or bottom surface; (b) a bearing or other pivot is secured to the bottom surface of the base for facilitating rotation of the platform; and (c) retainer for removably retaining a box top cover or similar part of the jigsaw puzzle box which shows the scene to be re-created is mounted to the upper surface of the platform.

10 Claims, 5 Drawing Sheets

ROTATABLE PLATFORM

CROSS REFERENCE TO RELATED APPLICATION

This application is a completion application of U.S. Provisional Patent Application Ser. No. 63/118,227, filed on Nov. 25, 2020 for "ROTATABLE PLATFORM", the disclosure of which is hereby incorporated by reference in its entirety, including the drawing.

BACKGROUND OF THE INVENTION

1. Field of the Invention

The present invention concerns rotatable platforms. More particularly, the present invention concerns tabletop rotatable platforms. Even more particularly, the present invention concerns tabletop rotatable platforms for use in conjunction with games and playthings.

2. Prior Art

As is known to those skilled in the art to which the invention pertains, jigsaw puzzles and other types of similar tabletop games invariably involve two or more persons who either are in competition with each other or cooperate to construct a game from multiple game pieces.

In dealing with these types of games, and, in particular, jigsaw puzzles, there is a constant need to reference the cover of the game box in order to coordinate the finished product, which is depicted on the box cover, and the layout of the puzzle, itself.

Where two or more persons are involved in piecing together a jigsaw puzzle, there is the difficulty of sharing the box top cover. First, oftentimes, the box top cover has to be laid in a horizontal direction since it is not stable enough to be maintained upstanding. Second, if the box top is upstanding, placing it in an appropriate position is often impeded by the dimension of the tabletop surface, itself.

Thus, and especially with multiple piece jigsaw puzzles which are to be assembled by two or more persons, an advantage would be provided by a stand or platform which can be easily rotated between the persons working on the puzzle.

It is this to which the present invention is directed.

SUMMARY OF THE INVENTION

The present invention provides a rotatable platform for use with jigsaw puzzles and the like which includes a base. The base having a top surface and a lower bottom surface. Means for rotating the platform is secured to the bottom surface of the base, such as a bearing assembly, pivot pin and the like.

A pair of spaced apart fingers are mounted onto the top surface which removably retain an item such as a box top cover or the like. The present invention is particularly suited for use by multiple jigsaw players attempting to assemble a jigsaw puzzle at the same time by facilitating viewing of the same upon which the puzzle pieces are based.

For a more complete understanding of the present invention reference is made to the following detailed description and accompanying drawing.

In the drawing like reference characters refer to like parts throughout the several views in the:

DESCRIPTION OF THE PRESENT INVENTION

Figure 1:
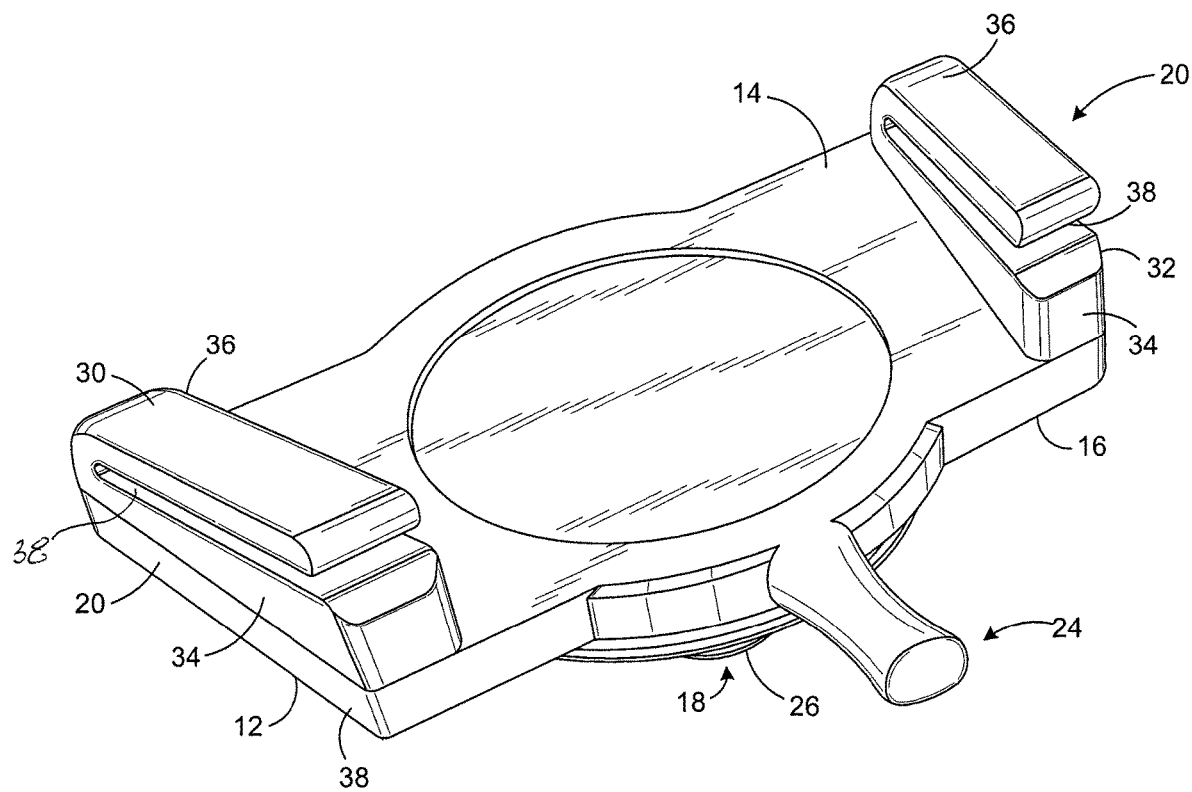
FIG. 1 is a top view of the rotatable platform of the present invention.
Figure 2:
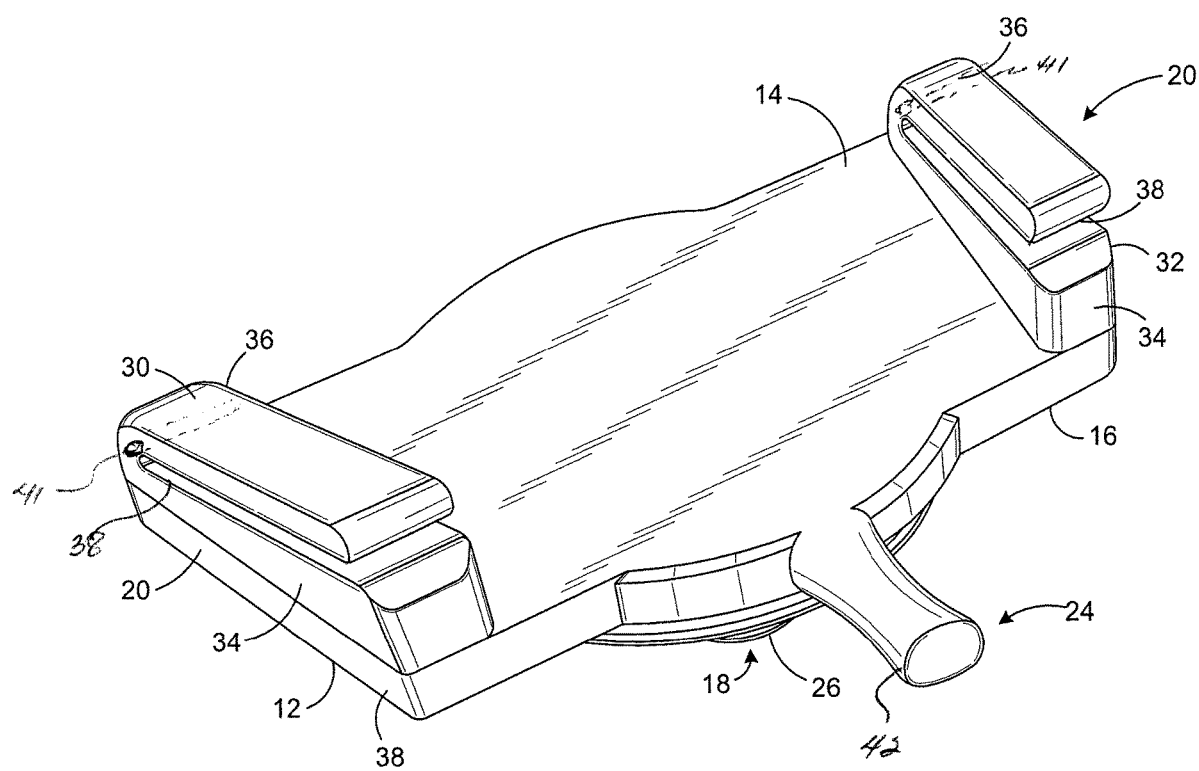
FIG. 2 is a perspective view of a fully assembled platform hereof.
Figure 3:
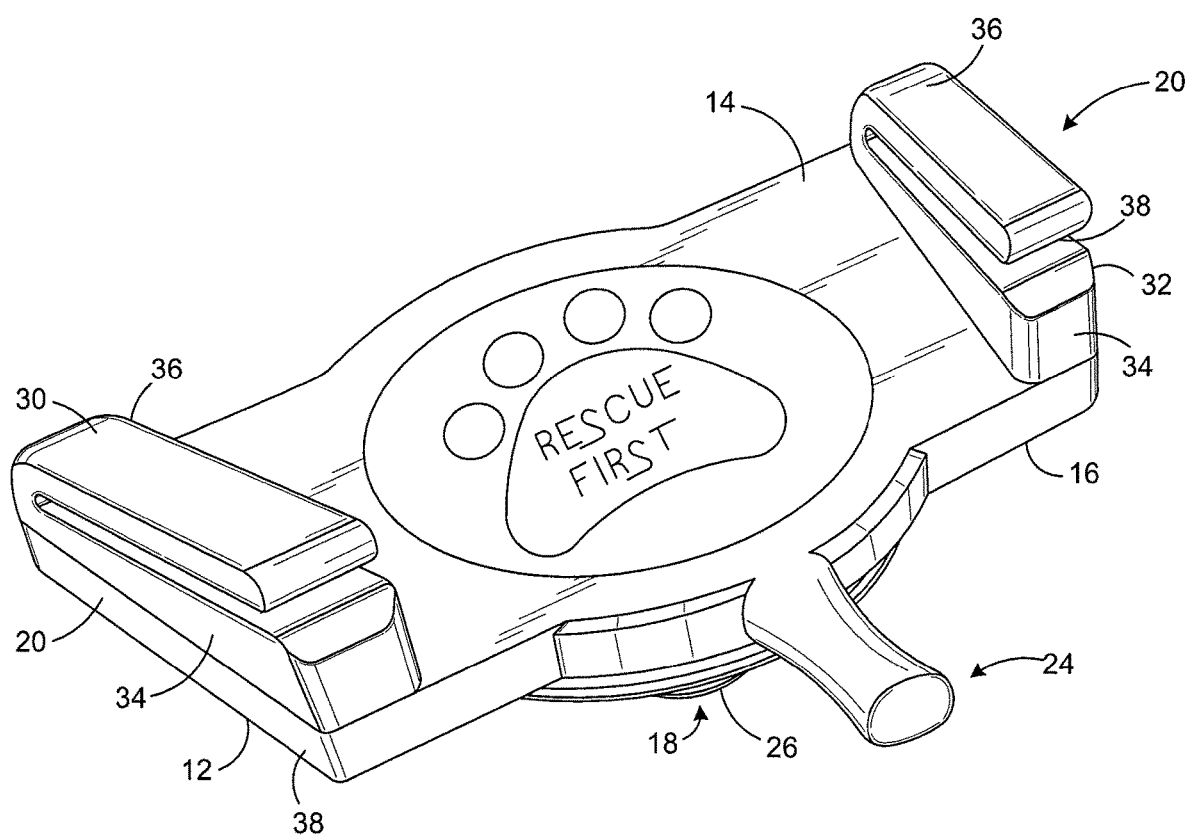
FIG. 3 is a perspective view of the assembled platform with a jigsaw puzzle box top positioned thereon.
Figure 4:
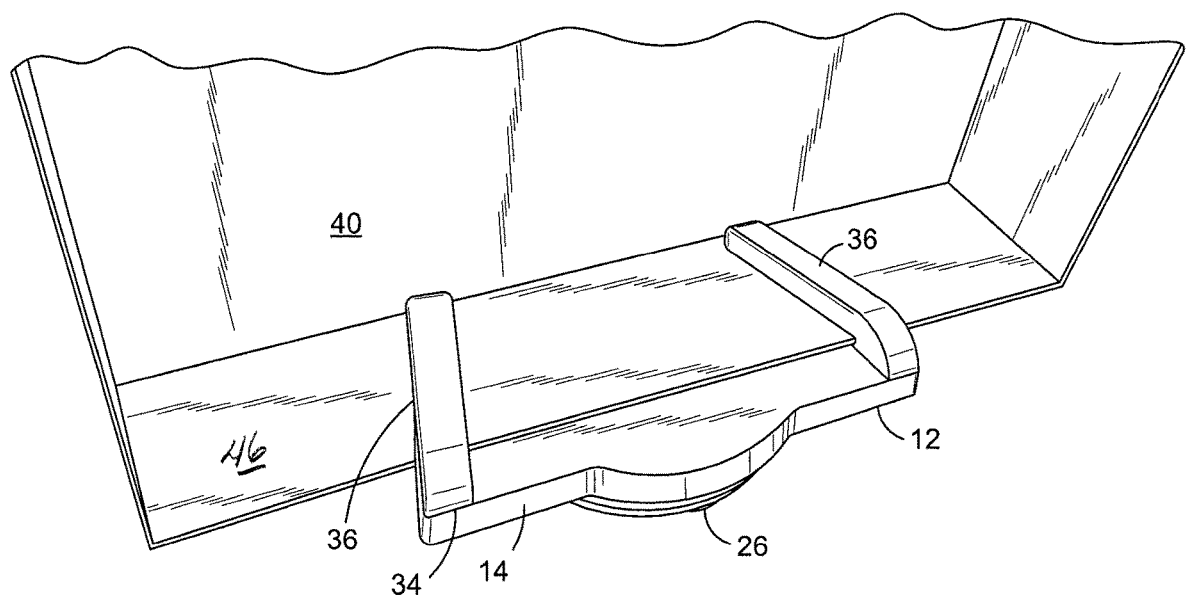
FIG. 4 is a further perspective view of the platform hereof showing the inside of the box top when the cover is positioned thereon.
Figure 5:
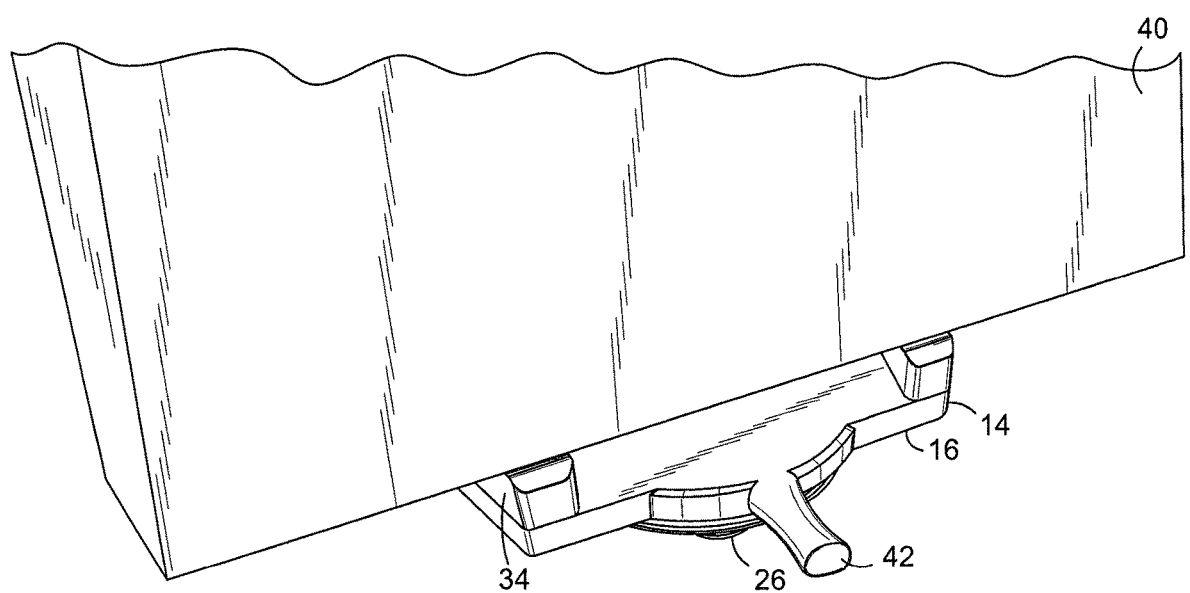
FIG. 5 is a perspective view of the present device showing the interior of the box top cover when positioned on the device.

Now, and with reference to the drawing, there is provided a rotatable platform in accordance herewith, generally denoted at 10. The platform comprises: (a) a base 12 having an upper or top surface 14 and a lower surface or bottom surface 16; (b) means 18 for rotating the platform secured to the bottom surface 16 of the base 12; (c) means 20 for removably retaining a box top cover which is mounted to the upper surface or top surface 14 of the platform 10. Optionally, means 24 for grasping of the platform may also be provided.

With more particularity, and as shown in the drawing, the base 12 is a substantially planar member dimensioned to removably seat on a table top or other horizontal surface.

The means 18 for rotating, preferably, comprises a bearing assembly 26 removably secured to the bottom surface 16. The bearing assembly contemplated for use herein is secured to the base by any suitable means, such as by press fitting, adhesive, or other means, such as suitable threaded fasteners or the like. Such bearing assemblies are well known and commercially available and generally comprise a two-piece housing having races in which ball bearings are disposed in one race and the other race is stationary.

It is to be understood that, although in its preferred embodiment, the means for rotating comprises a bearing assembly, other means for rotating such as a pivot pin, or the like, can be used herein with equal efficacy.

As shown in the drawing, the means 20 preferably comprises a pair of spaced apart fingers, 30, 32. The fingers 30, 32 are threadably mounted to the upper surface 14 of the base 12.

Each finger comprises a lower body 34 and an overlying coplanar upper body 36. A gap 38 is provided between the upper and lower bodies to enable removable positioning of an item, such as a jigsaw puzzle box top 40 or the like in the gap.

It is possible to provide a bias, such as a spring 41 interposed the upper and lower bodies to define a clamp for urging the bodies toward each other In order to facilitate rotation of the means 24 comprises a handle 42 integrally formed with the platform and extends laterally outwardly therefrom to facilitate rotation of the platform by grasping.

In its preferred embodiment and as shown, the present device is used to removably position a box top or cover 40 such as that for a jigsaw puzzle 44 by inserting into the Bap 38 the cover 40 or whatever pictorial representation of the puzzle is provided.

It is further contemplated that in the practice of the present invention, a recess 48 be formed in the upper surface 14 of the base 12 which can have emplaced therein indicia, such as an advertisement, printed piece, or the like.

In use, a side 46 of the box top 40 is inserted into the gap 38 between the fingers 30, 32 at the opposite ends of the side in which it is securely retained. Thereafter, in assembling an item such as a jigsaw puzzle, users can easily rotate the box top of the puzzle via the handle enhance the ability to visually observe what the final assembly is to look like to facilitate the selection of the proper pieces for solving the puzzle.

Thus, the present device provides a rotatable platform for facilitating the ability of more than one person to more rapidly solve the jigsaw puzzle.

The invention claimed is:

1. A rotatable platform comprising:
   (a) a base having an upper surface and a lower surface;
   (b) means for rotating the platform secured to the bottom surface of the base; and
   (c) means for removably retaining a jigsaw puzzle box cover, the means being mounted to the upper surface of the platform, the means comprising a pair of spaced apart fingers threadably mounted to the upper surface of the base, each finger having a lower body portion and an upper body portion overlying the upper body, the upper and lower bodies cooperating to provide a gap therebetween for removably seating an item therewithin.

2. The rotatable platform of claim 1 wherein the base is a substantially planar member dimensioned to removably seat on a table top or other horizontal surface.

3. The rotatable platform of claim 1 wherein the means for rotating comprises a bearing assembly removably secured to the bottom surface of the base.

4. The rotatable platform of claim 1 wherein the means for rotating comprises a pivot pin secured to the base.

5. The rotatable platform of claim 1 farther includes a spring interposed the upper and lower bodies to urge the fingers together.

6. The rotatable platform of claim 1 which further comprises a handle integrally formed with the platform and extending laterally outwardly therefrom to facilitate grasping of the platform.

7. The rotatable platform of claim 1 wherein the fingers removably retain a box top depicting a scene from which the jigsaw puzzle is to be assembled.

8. A rotating platform for a jigsaw puzzle box cover for positioning the cover in the line of sight of a user, the platform comprising:
   (a) a base having an upper or top surface and a lower surface or bottom surface;
   (b) means for rotating the platform secured to the bottom surface of the base; and
   (c) means for removably retaining a jigsaw puzzle box cover, the means for removably retaining mounted to the upper surface or top surface of the platform, the means for removably retaining comprises a pair of spaced apart fingers threadably mounted to the upper surface of the base, each finger having a lower body portion and an upper body overlying and coplanar with the upper body, the upper and lower bodies cooperating to provide a gap therebetween for removably seating an item therewithin.

9. The platform of claim 8, further includes a spring interposed the upper and lower bodies to urge the fingers together.

10. The platform of claim 8, which further comprises:
    a handle integrally formed with the platform and extending laterally outwardly therefrom to facilitate grasping of the platform.

\* \* \* \* \*